United States Patent [19]

Gauchel et al.

[11] 4,411,613

[45] Oct. 25, 1983

[54] APPARATUS FOR THE VACUUM CALIBRATION OF PROFILED ARTICLES MADE OF A THERMOPLASTIC SYNTHETIC RESIN

[75] Inventors: Peter Gauchel, Eitorf-Alzenbach; Josef Kurth, Troisdorf, both of Fed. Rep. of Germany

[73] Assignee: Dynamit Nobel Aktiengesellschaft, Troisdorf, Fed. Rep. of Germany

[21] Appl. No.: 272,575

[22] Filed: Jun. 11, 1981

Related U.S. Application Data

[62] Division of Ser. No. 16,171, Feb. 28, 1979.

[30] Foreign Application Priority Data

Mar. 4, 1978 [DE] Fed. Rep. of Germany ....... 2809386

[51] Int. Cl.$^3$ ...................... B29C 17/00; B29D 23/00
[52] U.S. Cl. .................................. 425/388; 264/560; 264/568; 425/326.1
[58] Field of Search ...................... 264/560, 566, 568; 425/326.1, 388

[56] References Cited

U.S. PATENT DOCUMENTS

| | | | |
|---|---|---|---|
| 3,546,745 | 12/1970 | Ball . | |
| 3,668,288 | 6/1972 | Takahashi | 264/235 X |
| 4,120,926 | 10/1978 | Titz | 264/568 |
| 4,181,487 | 1/1980 | Kessuer | 425/326.1 |

FOREIGN PATENT DOCUMENTS

| | | |
|---|---|---|
| 1016009 | 2/1958 | Fed. Rep. of Germany . |
| 1148736 | 5/1963 | Fed. Rep. of Germany . |
| 1187361 | 2/1965 | Fed. Rep. of Germany . |
| 2291896 | 4/1969 | Fed. Rep. of Germany . |
| 1809285 | 6/1970 | Fed. Rep. of Germany . |
| 2239746 | 2/1974 | Fed. Rep. of Germany . |
| 2244294 | 3/1974 | Fed. Rep. of Germany . |
| 1048111 | 11/1966 | United Kingdom . |
| 1282908 | 7/1972 | United Kingdom . |
| 1360868 | 7/1974 | United Kingdom . |
| 1401586 | 7/1975 | United Kingdom . |
| 1414507 | 11/1975 | United Kingdom . |
| 1417312 | 12/1975 | United Kingdom . |
| 1516598 | 7/1978 | United Kingdom . |

OTHER PUBLICATIONS

*Journal Plastiver Arbeiter*, 1977, p. 516.

*Primary Examiner*—Jan H. Silbaugh
*Attorney, Agent, or Firm*—Antonelli, Terry & Wands

[57] ABSTRACT

A process for the calibration of a profiled article of thermoplastic synthetic resin wherein a vacuum is applied to the external surface of the profiled article while the article is drawn through a calibrating tool and wherein the profile surface of the profiled article is cooled indirectly by a liquid coolant flowing through ducts within the calibrating tool involves applying a vacuum via a plurality of slots within the calibrating tool which are place adjoining the profile surface and feeding coolant through the ducts of the calibrating tool in such a manner that the coolant is discharged by means of the vacuum via the profile surface which is under the vacuum.

6 Claims, 8 Drawing Figures

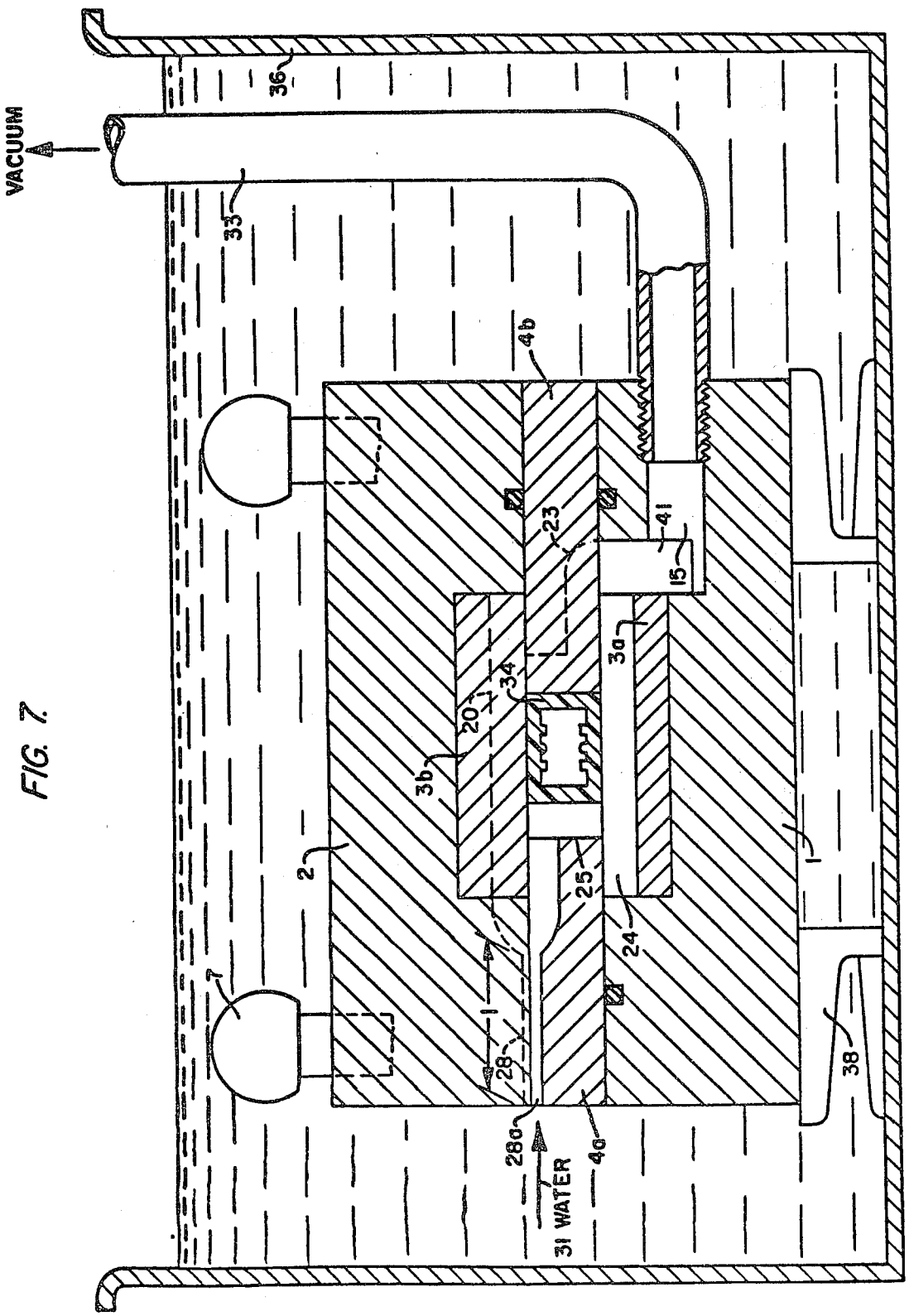

APPARATUS FOR THE VACUUM CALIBRATION OF PROFILED ARTICLES MADE OF A THERMOPLASTIC SYNTHETIC RESIN

This is a division of application Ser. No. 16,171, filed Feb. 28, 1979.

The invention relates to a process for the calibration of profiled articles or structures made of thermoplastic synthetic resins by a vacuum that is effective externally on the surface of a profiled article while the article is drawn through a calibrating tool, wherein the surface of the profiled article is cooled indirectly by a cooling medium flowing through ducts in a calibrating tool and wherein the vacuum is built up in slots of the calibrating tool adjoining the profile surface, and to an apparatus for conducting the process wherein the calibrating tool is subdivided in parallel to the longitudinal extension of the profiled article and is constructed with ducts for the passage of a cooling medium and, with slots in calibrating walls of calibrating members in contact with the surface of the profiled article, the slots extending at right angles to the longitudinal extension of the profiled article and being connected to a vacuum source.

Processes for the vacuum calibration of thermoplastic synthetic resin profiles have been known, for example, from German Pat. No. 1,016,009. The quality and efficiency of a calibrating device also depends on the cooling efficiency, i.e. the heat transfer conditions. Therefore, numerous attempts have been made to improve the cooling action during vacuum calibrations; see, for example, DOS (German Unexamined Laid-Open Application) No. 2,239,747, wherein calibrating tools are provided with means for defining a zone for indirectly cooling the article with cooling medium alternate with direct cooling zones without calibrating tool. The direct cooling zones here consist in a water bath maintained under a vacuum. However, the interruption of the calibrating step is disadvantageous for cross sections of profiled articles which must undergo a complicated calibrating process.

Moreover, as described in "Plastverarbeiter" (Plastics Processor) 28th year, 1977, No. 10, pages 513–520, particularly page 516, it has been found that the drip water unintentionally taken in from the surrounding cooling bath through the vacuum slots in the calibrating tool during the vacuum calibration already exerts an additional cooling effect and that heat is removed from the article to be calibrated also due to this drip water.

Furthermore, it has been known, for example, from DOS No. 2,535,286 to provide within a vacuum calibrating tool, besides indirect cooling, also a direct cooling of the profiled article to be calibrated, i.e. in addition to cooling the calibrating tool, a coolant is also provided for contacting the surface of the article directly at various points.

The present invention is based on the object of further improving the cooling techniques in vacuum calibration; in this connection, the calibrated tool with a cooling device is also to be capable of being manufactured with maximum simplicity.

The invention attains the above object with respect to the process for effecting vacuum calibration by removing the cooling medium, which is fed through the ducts of the calibrating tool, with the aid of a vacuum by way of the surface of the profiled article, which is under the effect of the vacuum. In the process of this invention, the coolant cycle is thus connected directly to the vacuum cycle. Consequently, in accordance with the invention, the cooling medium conducted in the calibrating tool for cooling the profiled article while the article is drawn through the tool is now utilized for a direct cooling of the profile surface, due to the feature that the cooling medium in its entirety is conducted to the profile surface through the vacuum slots serving for the vacuum calibration and is simultaneously withdrawn by means of the vacuum source connected to the vacuum slots. In this way, it is possible to accomplish a uniform and continuous, as well as intensive cooling of the thermoplastic article to be calibrated. The pressure relationships existing with regard to the cooling medium and the vacuum calibration are advantageously adapted to each other in accordance with the invention. This is done, for example, by lowering the coolant pressure before the coolant enters the vacuum-exposed zone on the profile surface of the profiled articles, preferably to a value approaching the vacuum.

On account of the connection of the cooling medium to the vacuum calibrating system according to this invention, the vacuum is reduced by the pressure existing in the coolant cycle. As long as such reduction does not go too far, the calibration of the profile surface is not as yet affected. However, in case of a higher coolant pressure and greater amounts of coolant, this reduction is counteracted by means of the above-described measures, namely by the installation of a throttle for lowering the coolant pressure. At the same time, the cooling procedure according to the invention provides that the coolant, e.g. water, as soon as it is drawn into the zone under vacuum, is conducted past the profile surface of the profiled article with increased velocity. In this way, the cooling effect is considerably enhanced.

The apparatus for the calibration of profiled articles of a thermoplastic synthetic resin by means of a vacuum effective externally on the surface while the article is drawn through a calibrating tool initially includes a calibrating tool which is subdivided in parallel to the longitudinal extension of the article and is fashioned with ducts for the passage of a cooling medium and, in the calibrating walls of the calibrating members contacting the profile surface, with slots extending at right angles to the longitudinal extension of the profiled articles and being in communication with a vacuum source. To increase the calibrating efficiency and to make the cooling more intensive, the calibrating tool is constructed according to the invention so that the cooling medium cycle and the vacuum cycle are combined in such a way that the ducts for the coolant are connected to the vacuum slots, and the coolant fed via the ducts can be discharged by means of vacuum through the vacuum slots. Due to the combining of coolant cycle and vacuum cycle in accordance with the invention so that the cooling ducts are placed in communication with the vacuum slots, the construction of the calibrating tool can be made substantially more simple. In particular, the separate water drains of the coolant cycles are eliminated, since there are combined with the vacuum connections. The intensive cooling effect is not attained by a voluminous and complicated cooling duct system within the calibrating tool, but rather by connecting the coolant cycle to the already present vacuum slots and thus to the vacuum calibrating system.

A particularly advantageous further development of the calibrating tool of this invention provides that the ducts for the coolant are fashioned as open grooves in the longitudinal extension of the calibrating tool on the surfaces of the calibrating members, wherein each duct has at least one coolant inlet and is preferably connected to several vacuum slots. The ducts required for conducting the coolant thus can simply be milled into the surface of the calibrating members, and it is no longer necessary to provide the calibrating members with bores extending all the way therethrough, as in case of an indirect cooling of the profiled article.

The size and structure of a calibrating tool also depend essentially on the cross section of the profile article to be calibrated. For more complicated profile cross sections it may be necessary to subdivide the calibrating tool in the longitudinal extension into two, four, six or more calibrating members, so that even undercut cross sections can be processed. In such multipartite calibrating tools, it is advantageous along the lines of the invention to provide in a calibrating tool two or more duct-vacuum slot cycle systems in series arrangement in the longitudinal extension and/or in superimposed arrangement as seen in cross section. In this way, it is possible to attain a rapid flow of coolant and also to raise the cooling intensity. It is furthermore possible thereby to effect cooling intensities over the length of a calibrating tool, since the highest cooling efficiency is required upon entrance of the profile into the calibrating tool and decreases with a growing solidification of the profile toward the outlet of the calibrating tool.

In a further embodiment of the invention, the provision is made to adjust the amount of coolant flow by means of a proportion of the size of the flow cross section of the duct feeding the coolant as related to the sum total of the flow cross sections of the vacuum slots connected to this duct. In this way, it is possible to affect the reduction of the vacuum in the calibrating zone on the profile surface, caused by the pressure of the coolant, or even to entirely prevent such reduction. The reduction is attained by the construction of the calibrating tool, for example, by throttling the flow cross section of the ducts feeding the fluid coolant prior to the entrance into the vacuum slots, preferably to such an extent that the flow cross section for the coolant is smaller than the flow cross section of the vacuum slots connected thereto. However, it is also feasible to reduce the coolant pressure in the entrance zone to the vacuum calibration area by the installation of a pressure-reducing valve in front of or within the duct feeding the coolant, wherein this coolant pressure is optionally reduced until it is below the vacuum. In this way, a decay of the calibrating vacuum is prevented and a uniform calibration of the profiled article is ensured.

Thus, due to the direct connection of the coolant for the calibrating tool to the vacuum system of the calibrating tool, an intensive cooling action is achieved, while the calibrating tool is simultaneously made simpler in its structure, and the calibrating action is maintained by the elimination of a complicated cooling duct system. The intensive cooling effect is attained over the entire periphery of the profiled structure, which simultaneously constitutes a very uniform cooling action. The still required cooling ducts to feed the coolant to the vacuum slot system can be arranged in a freely accessible fashion in the individual calibrating members on the surfaces thereof; consequently, these cooling ducts are not only easy to produce but can also be readily cleaned at any time. Moreover, connection lines are eliminated so that the operation of the calibrating tool is simplified.

The invention will be explained in greater detail in the drawings with reference to embodiments thereof, to wit:

FIG. 7 shows a calibrating tool in a cross-sectional, schematic view with a single coolant-vacuum circuit.

Figure 1:
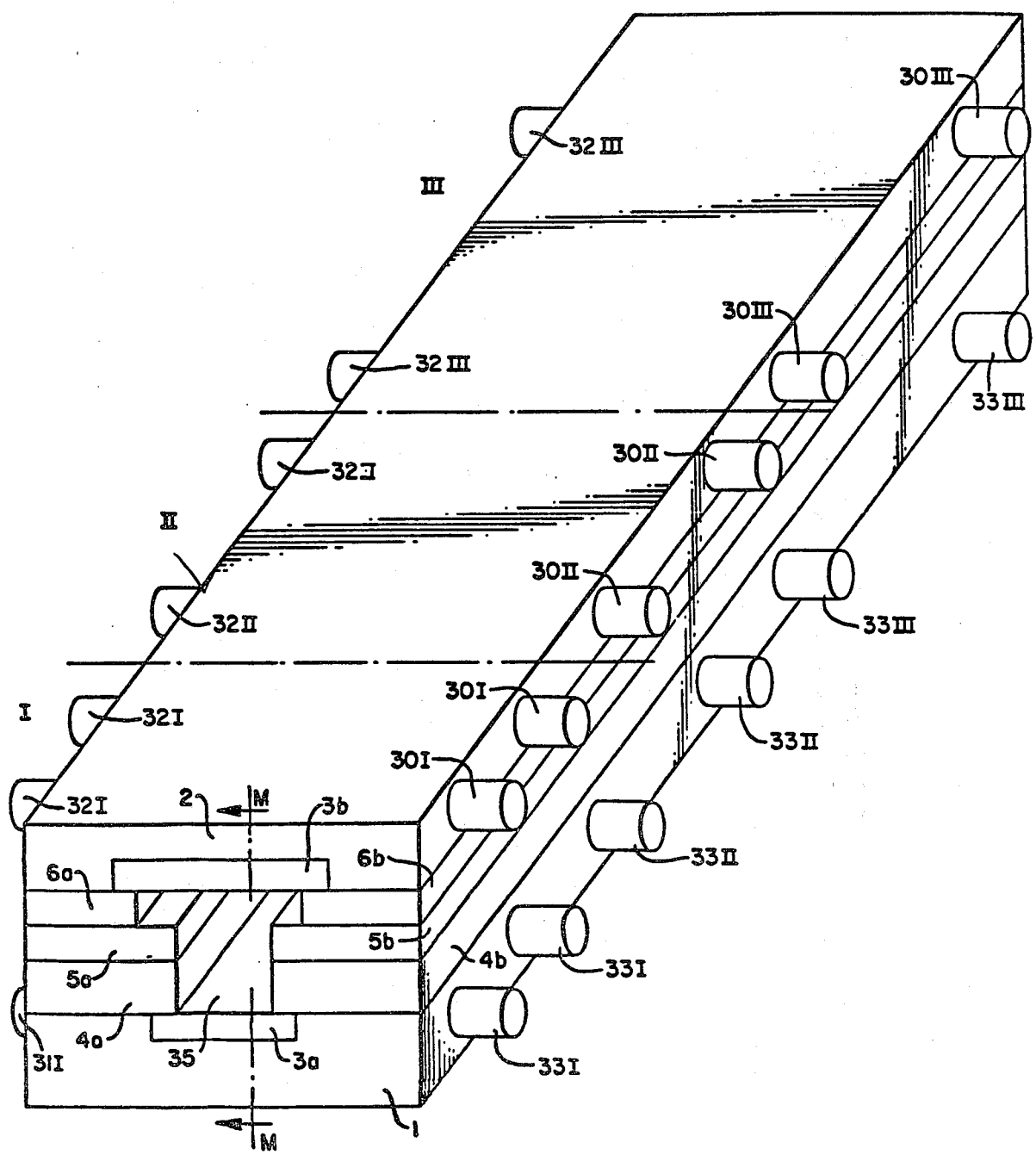
FIG. 1 shows a schematic view of a multipartite vacuum calibrating tool.

The calibrating tool shown schematically in FIG. 1 serves for the calibration of an extruded profiled article of thermoplastic synthetic resin and is arranged downstream of the extrusion head of an extruder. The calibrating tool operates under vacuum and furthermore includes a cooling system with ducts in the calibrating tool to remove the extrusion heat from the extruded article. The calibrating tool shown schematically in FIG. 1 has a T-shaped calibrating aperture 35 for a corresponding T-shaped profiled article. The calibrating tool is subdivided, in the longitudinal extension of the profiled article, into individual calibrating members which are also fashioned to correspond to portions of the calibrating aperture 35. In the illustrated embodiment, the calibrating tool comprises the bottom member 1, the top member 2, as well as the lateral calibrating members 4b, 5b, 6b, as well as 4a, 5a, and 6a, located on the right-hand and left-hand sides, respectively. In the embodiment shown in the drawings, the plates 3a, 3b are inserted in the bottom calibrating member as well as in the top calibrating member. The subdivision of the calibrating tool is, of course, dependent on the desired calibrating aperture 35. FIG. 1 does not show the vacuum slots for applying the vacuum to the surface of the profile to be calibrated, which slots are fashioned at right angles to the longitudinal extension of the profiled article in the calibrating walls contacting the profile surface and are spaced apart from one another. These vacuum slots, not shown, are connected to a vacuum source; FIG. 1 shows the vacuum connections 32 and 33. The coolant connections 31 and 30 are provided for feeding the cooling medium. The calibrating tool is subdivided into three zones I, II, and III, wherein each zone per se contains a closed coolant-vacuum cycle. The coolant is fed in each case via connections 30 and withdrawn via the vacuum connections 33. This means, for example, that the coolant fed by way of the inlets 30 I is removed via the vacuum connections 33 I. The connections illustrated on the right-hand side of the calibrating tool are repeated on the left-hand side of the tool, but here the vacuum connections are mounted at the top, i.e. in member 2, and the water connections are mounted at the bottom, i.e. in member 1.

Figure 2:
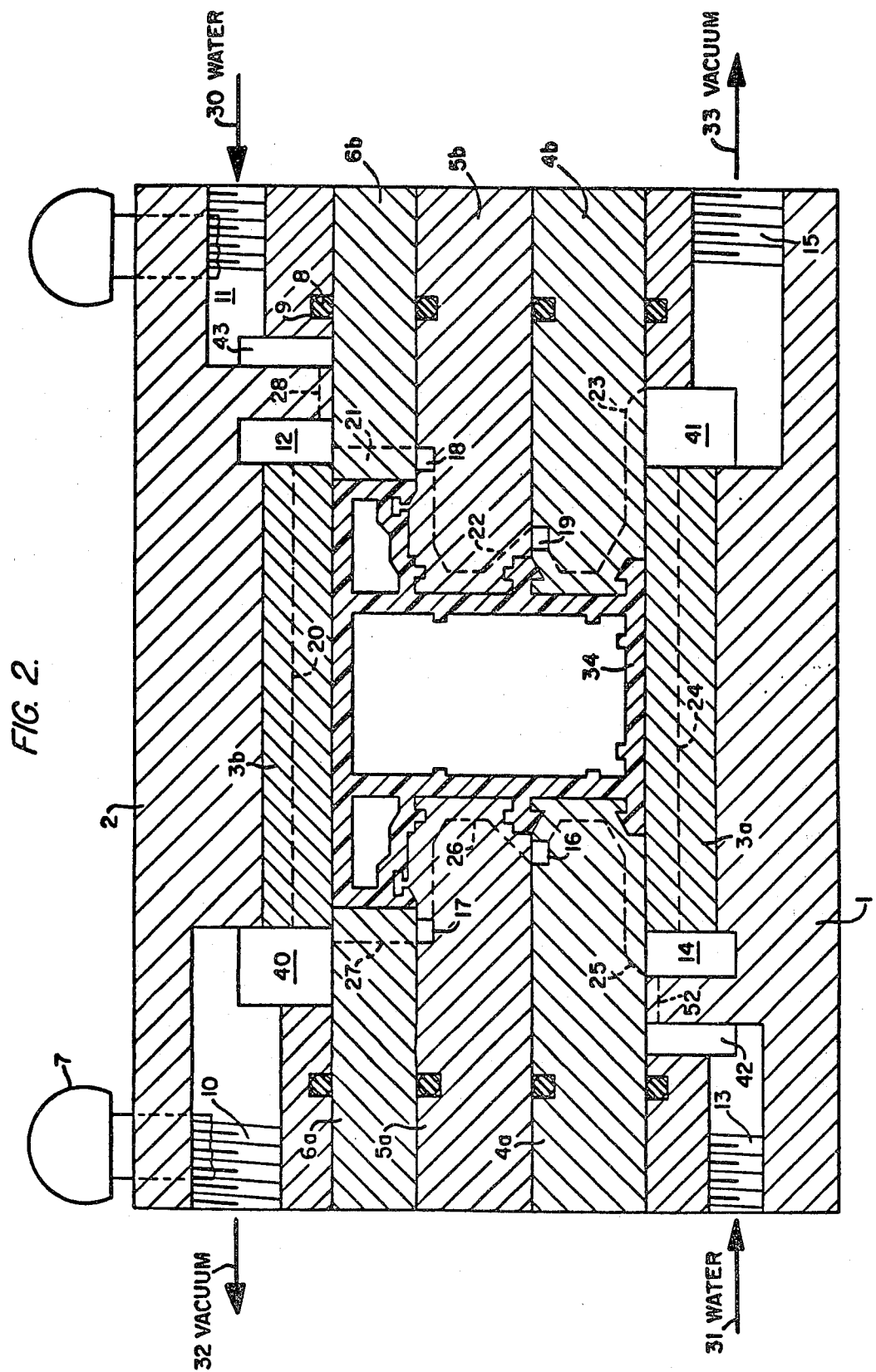
FIG. 2 shows a cross section, in detail, through a vacuum calibrating tool of the type shown in FIG. 1 for producing a multichambered hollow profiled article with two coolant-vacuum circuits.

FIG. 2 shows, in cross section, a full-scale detailed view of the calibrating tool which is shown in a simplified fashion in the schematic view of FIG. 1. The T-shaped multichambered hollow synthetic resin article 34 shown in FIG. 2 is to be subjected to a calibrating step. The calibrating tool illustrated in cross section is subdivided in parallel to the longitudinal direction of the article and of the calibrating tool. In the illustrated embodiment, the tool comprises a plurality of plate-like members, i.e. the bottom member 1, the top member 2, the left-hand lateral members 4a, 5a, 6a, as well as the right-hand lateral members 4b, 5b, 6b, and in the bottom and top member inserted plates 3a, 3b which all are combined or held together by threaded connectors 7, not shown in detail. Furthermore, the individual surfaces of the calibrating members are sealed with respect to one another; for this purpose, the sealing means 8 are arranged in grooves 9 on the contact surfaces of the individual calibrating members extending in parallel to the longitudinal extension of the calibrating tool. To be able to calibrate the profiled article 34 with the aid of vacuum, the so-called vacuum slots are worked into the calibrating walls adjoining the article 34; these slots extend at right angles to the longitudinal extension of the calibrating tool and article and are in close spaced-apart relationship.

In FIG. 2, the vacuum slots worked into the individual calibrating members are denoted by 20, 21, 22, 23, 24, 25, 26, and 27. In order to provide a maximally uniform and intense vacuum, two vacuum connections are arranged in the illustrated embodiment according to FIG. 2, namely, on the one hand, in the bottom member, the vacuum connection 33 and, on the other hand, the vacuum connection 32 in the top member. The vacuum slots are in communication with one another by means of connecting ducts extending in the longitudinal direction of the calibrating tool; these are the connecting ducts 40, 12, 18, 19, 41, 14, 17, and 16. The connecting ducts 41 and 40 in turn, can then be connected to the vacuum 33 or 32 via the bores 15 or 10, respectively.

To cool the thermoplastic profile 34 to be calibrated, which is still heated up from the extrusion, the calibrating tool is cooled by means of a coolant, for example water. According to the invention, this coolant cycle is no longer provided as a separate circuit from the vacuum cycle within the calibrating tool, but rather is combined with the vacuum cycle. For this purpose, the coolant, for example water, is conducted via connections 30, 31 to the calibrating tool via connecting bores 11, 13, from where it is placed in communication with the vacuum slot system via ducts 42, 43, 28, 52, passed through the vacuum slots, removed by suction from the vacuum connecting bores 10, 15 and discharged.

According to the invention, a closed cycle of coolant and vacuum is provided. In the illustrated embodiment according to FIG. 2, two coolant-vacuum circuits are arranged in superimposed relationship as seen in cross section. Since the coolant, e.g. water, is normally fed to the calibrating tool via connections 30, 31 under excess pressure, e.g., 2 atm. gauge, this coolant pressure will, if not controlled, effect, in the inlet zone toward the vacuum slots, a reduction in the vacuum ambient therein to zero or even a reduction to excess pressure. This holds true in the embodiment of FIG. 2 particularly for the vacuum slots 25, 24 in the zone adjoining duct 14, and for vacuum slots 20, 21 in the zone adjoining duct 12. This reduction in vacuum is counteracted by fashioning the connecting ducts 28, 52 conducting the coolant to the vacuum slots as throttles; thus the flow cross section of the coolant fed thereto is diminished, and a corresponding reduction in the coolant pressure is attained. The throttling effect of the ducts 28, 52 is, in this connection, dependent on the cross section of the ducts 28, 52 as related to the flow cross section of the vacuum slots connected thereto, and on the length of the throttle, i.e. in the embodiment of FIG. 2 on the spacing between the ducts 42 and 14, or 12 and 43, from each other. If the throttling cross section of the ducts 28 and 52 is smaller than the cross section of the connected vacuum slots, then the pressure relationships are reversed, and the coolant, here water, is sucked into the vacuum slots and conducted under increased speed over the profile surface and exhausted from the vacuum connections 32, 33.

Figure 3:
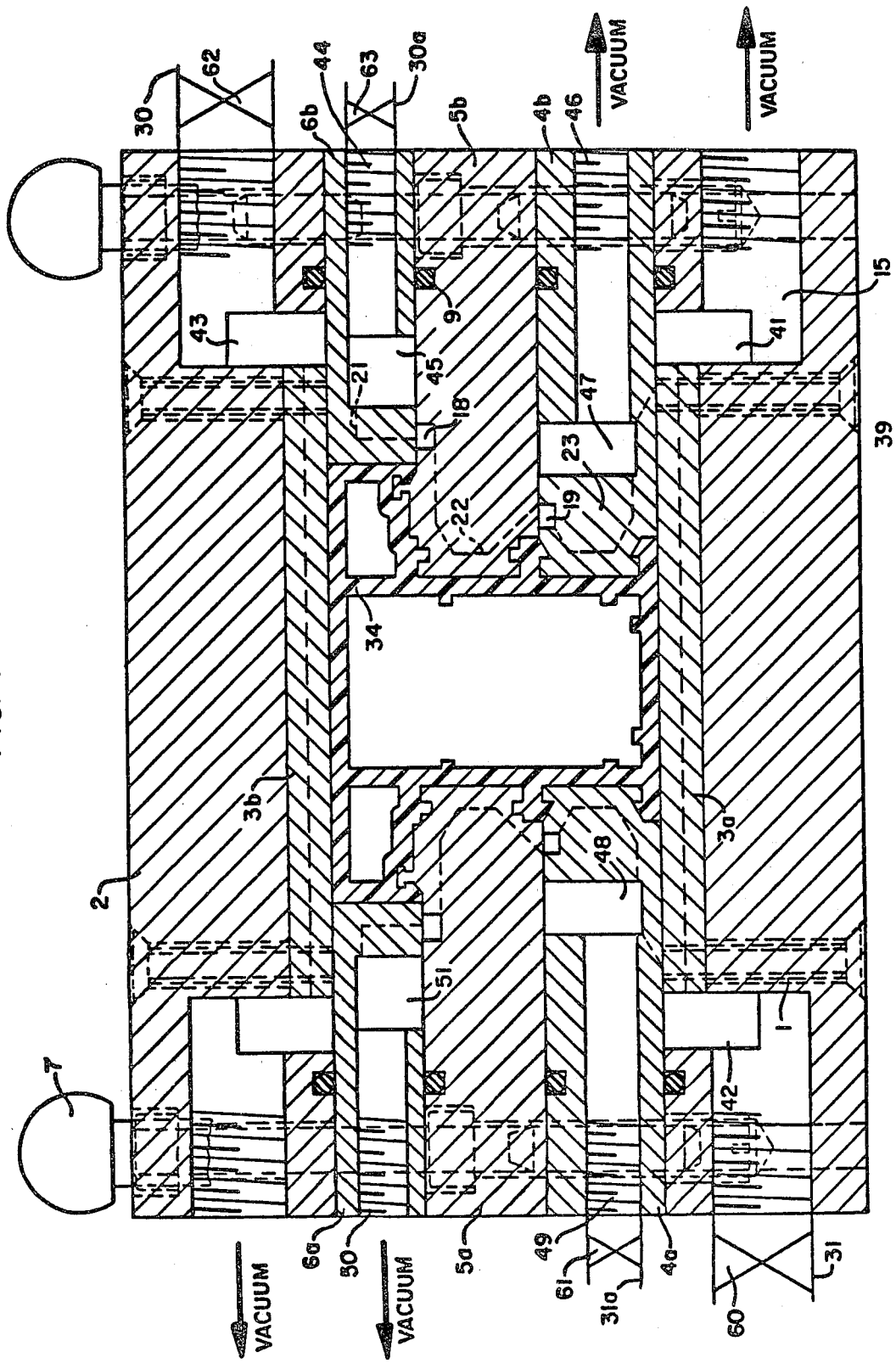
FIG. 3 shows a cross section through a calibrating tool for a multichambered hollow profile analogously to FIG. 2 with four coolant-vacuum circuits.

FIG. 3 shows a modification in the calibration of the profile 34 according to FIG. 2, wherein the calibrating tool, shown in cross section, is likewise subdivided in parallel to the longitudinal extension into top member 2 and bottom member 1, as well as into the lateral members 4a, 5a, 6a, as well as 4b, 5b, 6b, but wherein, instead of two coolant-vacuum circuits, there are four such coolant-vacuum circuits to render the cooling action more intensive. In supplementation of the vacuum connections shown in FIG. 3, the vacuum connecting bores 50 and 46, as well as additionally the water connecting bores 44 and 49 are provided. Correspondingly, further ducts are required connecting the connections to the vacuum slots, and these are the ducts 51, 45, 47, and 48. In the illustrated example according to FIG. 3, the transition cross sections for the coolant to the vacuum slots, namely adjacent to ducts 42, 48, and 43, 45, respectively, are not reduced as compared with the cooss sections of the vacuum slots. In this embodiment, the throttling effect is accomplished by pressure-reducing valves 60–63 installed in the water connections. Thus, although the coolant can enter the vacuum slots unhindered, a sufficient calibration of the profile surface is yet attained. Due to the installed pressure-reducing valves for the coolant, the vacuum necessary for the calibtating step can be maintained even in the inlet zone of the coolant.

Figure 6:
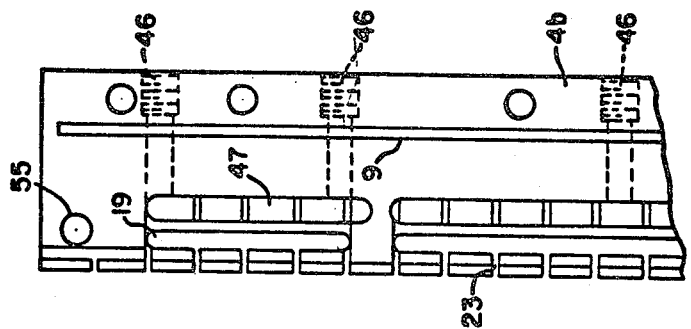
FIGS. 4, 5 and 6 show, respectively, partial top views of calibrating members of the calibrating tool according to FIG. 3.
Figure 5:
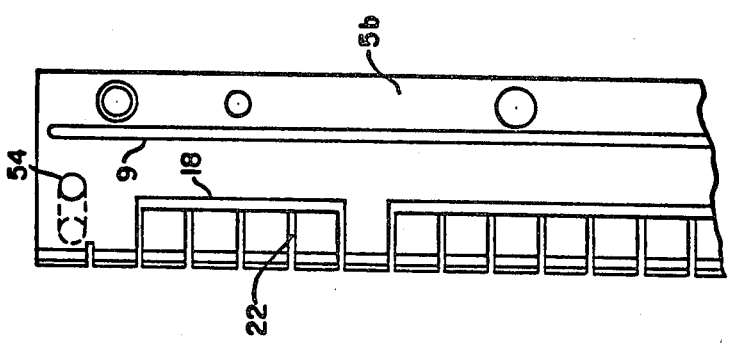
Figure 4:
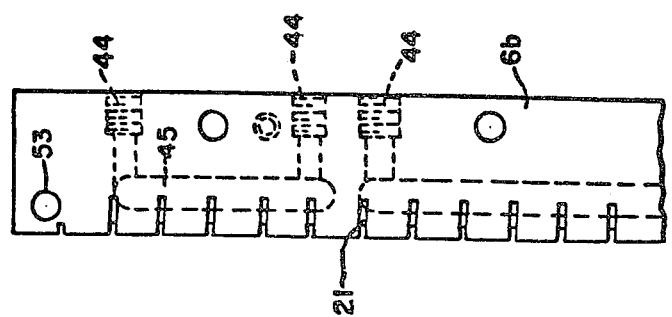

The calibrating structure according to the invention has the advantage that the required vacuum slots as well as all connecting ducts and coolant-conducting ducts can be worked as open grooves into the surfaces of the calibrating members. In FIGS. 4–6, views of the calibrating members of FIG. 3 are shown in fragmentary illustration. FIGS. 4–6 represent a top view of the calibrating members of FIG. 3 on a reduced scale.

FIG. 4 shows a top view of the calibrating member 6b of FIG. 3; the bores not denoted in detail serve for threading the calibrating members together. In the calibrating walls in contact with the profile, the vacuum slots 21 are provided at mutual spacings, wherein the spacing between the vacuum slots and their size are dependent on the article to be calibrated. Depending on the desired coolant throughput, as well as the cooling effect, several vacuum slots 21 can be connected to a common coolant cycle. It is advantageous, in the inlet zone of the calibrating tool, not to connect the first vacuum slot, or even several slots, to the coolant system, so that here the entering profiled article can first be placed in contact with the calibrating tool. For this first vacuum slot, an annular duct 53 can be provided, for example, additionally to furnnish indirect cooling. The next-following five vacuum slots are in communication with one another via the connecting duct 45 equipped with the connecting bores 44 for the feeding of the coolant. The adjoining, further vacuum slots are, in turn, combined into a unit and in communication with one another by means of a duct, not denoted in detail, and are again equipped with a a coolant feed. Depending on the length of the calibrating device, it is possible to arrange one, two, or more of such coolant-vacuum slot circuits one behind the other and, as can be seen from FIG. 3, in superimposed relationship.

FIG. 5 shows on a reduced scale the top view of the calibrating member 5b according to FIG. 3 in a fragmentary illustration. The calibrating element 5b has no coolant connection or vacuum connection, but rather is supplied by way of the vacuum slots 21 of the superimposed calibrating member 6b and/or the vacuum slots 23 of the calibrating member 4b adjoining on the other side. Also in the calibrating member 5b, the vacuum slots 22 are joined in groups by means of connecting ducts 18 running in the longitudinal extension of the calibrating device. The combination into groups corresponds to that of the calibrating members 6b and 4b, respectively, arranged thereabove and therebelow. Here again, the first vacuum slot in the calibrating inlet zone is not connected to the coolant system but rather is fed indirectly via the annular bore 54. Furthermore, the calibrating member 5b is fashioned with the groove 9 to insert a sealing means 8.

FIG. 6 shows on a reduced scale a top view of the calibrating member 4b. Here again, the first vacuum slot lying in the calibration inlet zone is not connected to the coolant system but rather is cooled indirectly by means of the annular bore 55. The subsequent vacuum slots 23 are again combined into groups and in communication with one another via the connecting ducts 19 and 47, respectively. The connecting ducts 47 are, in turn, connected to the vacuum via bores 46.

The principle of cooling and calibrating by means of vacuum with the use of calibrating tools, as illustrated in FIGS. 2–6, can be utilized for any desired profile cross sections. The correlation of coolant-vacuum circuits with the cross sections can take place symmetrically or also asymmetrically, depending on the requirements. The number of the circuits in superimposed arrangement as seen in cross section and/or in series arrangement in the longitudinal extension of the calibrating tool depends on the type of profiled article or structure to be calibrated.

FIG. 7 illustrates another embodiment of the invention wherein likewise a cross section is shown through the article to be calibrated, including the tool. The polymeric profiled article 34 to be calibrated involves a hollow profile having a relatively simple cross section; correspondingly, the calibrating tool is subdivided in parallel to the longitudinal extension into the bottom member 1, the top member 2, the plates 3a and 3b inserted in these members, as well as into the left-hand lateral calibrating member 4a and the right-hand lateral calibrating member 4b. The calibrating members are, in turn, threadedly connected via the screw connections 7, not shown in detail. The calibrating tool is inserted, on supports 38, in the water-filled container 36. The water, contained in the tank 36 and constantly replenished, serves for cooling the calibrating tool and the profiled article 34 to be calibrated. The vacuum required for calibrating the surface of article 34 is applied via the vacuum connection 33 to the calibrating tool and further applied to the profile surface via the ducts 15, 41 and the individual vacuum slots 23, 20, 25, and 24. The coolant from container 36 is fed to the surface of the profile via the connecting ducts 28, 28a. The water pressure to which the water entering the calibrating tool is exposed corresponds to the water column standing over the connecting zone 31. To prevent this water pressure from destroying the vacuum applied through the vacuum slots to the surface of article 34, thus preventing a flawless calibrating process, the water feed ducts 28, 28a are fashioned as throttles; the flow cross section of these throttles is smaller than the flow cross section of the vacuum slots connected thereto. In this context, the throttling effect is also dependent on the length of the throttle, i.e. from the water inlet 31 to the point where the water reaches the vacuum slots. In the illustrated example, only the zone denoted by L is fashioned as a throttle, rather than the entire zone between the water inlet 31 and vacuum slots 20 and 25, respectively. Due to the construction of the connecting ducts 28, 28a as throttles, the coolant is taken in by the vacuum, but the vacuum is not eliminated, and the coolant is conducted through the vacuum slots along the profile surface at an increased velocity and exhausted via the ducts 15, 41.

It is furthermore advantageous, as illustrated in FIG. 7, to arrange the connecting ducts 28 and 28a, located in calibrating members 2 and 4a, respectively, which are effective as throttles, in a mutually offset pattern. This entails the advantage that the topside of the profile to be calibrated, as well as the underside of the profile to be calibrated are supplied uniformly with coolant. It is also advantageous to arrange the vacuum slots to be mutually offset from one another, as can be seen from FIG. 7. This achieves at the same time a sealing of the connecting ducts 28, 28a with respect to each other, and a uniform distribution of the water.

Figure 8:
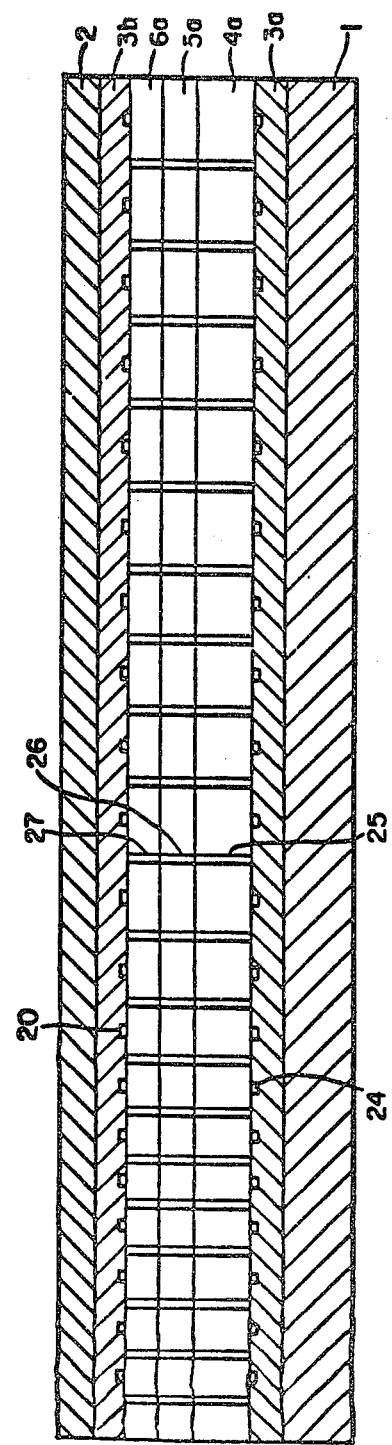
FIG. 8 shows a longitudinal section through the calibrating tool shown in FIG. 1 along line M—M.

According to the invention, the provision is made that the entire coolant fed to the calibrating tool, i.e. the cooling water, is removed again by suction via the vacuum connections. For this purpose, a voluminous duct system is provided in the interior of the calibrating tool to distribute the coolant. This duct system is then connected to the vacuum slots. The vacuum slots are indicated in FIG. 8 schematically, wherein FIG. 8 represents a longitudinal sections through FIG. 1 in plan view. The vacuum slots 20, 24, 25, 26, and 27, see also FIG. 2, can be arranged, as shown, in a mutually offset fashion. The vacuum connections 33 extend to these vacuum slots. On the other hand, the coolant is distributed in the calibrating tool by way of the channels and grooves shown, for example, in FIGS. 2, 3 and 4–6, all of these channels, in turn, being in communication with the vacuum slots, so that the introduced cooling water is conducted via the channels to the vacuum slots and withdrawn via the vacuum connections.

By means of the calibrating tool according to this invention, it is possible to effect a metering and distribution of the coolant quantity and thus a control of the cooling action for individual sections. The distribution and metering of the coolant can also be effected, in particular, by means of the size of the ducts connecting the vacuum slots, which represent the feed ducts for the coolant. Moreover, the quantity of coolant and/or the coolant throughput can also be controlled by the vacuum which is applied. Furthermore, the amount of coolant introduced via the coolant connections can be regulated from outside of the calibrating tool. By means of the selected proportion of the inlet size of the vacuum slots to the connecting ducts which feed and distribute the coolant, the pressure relationships can be affected, and thus also the coolant throughput can be influenced in its chronological progress.

Furthermore, the size of the vacuum slots is also governing for the desired cooling effect; the size of the vacuum slots can vary, as seen over the length of the calibrating device, and also the mutual spacing of the vacuum slots can be varied. Thus, when utilizing the invention, cooling water is being continuously conducted past the profile surface at a relatively high speed, whereby the respective quantities of cooling water are very rapidly exchanged, and thus no differences in the cooling intensity occur over the profile cross section of the profiled article.

The process of and apparatus of this invention will be further understood from an example of the operation of the apparatus shown in FIG. 2.

The following conditions are maintained during calibrating of a thermoplastic synthetic resin profile of hard PVC illustrated in FIG. 2 of the present application:

The profile, true to scale according to FIG. 2, and made of hard PVC, has a temperature of approximately between 195° and 200° C. upon entering the calibrating device. The profile is drawn through the calibrating device at a speed of 2 meters/minute. The calibrating tool has a length of 1 meter. Three coolant-vacuum cycles I, II, and III are connected in series; their lengths have a ratio of 1:2:3.

In the first zone I, 24 l. of water is fed per minute at a water entrance temperature of about 14° C. and a water exit temperature of between 22° and 24° C.

In the second zone II, 26 l. of water per minute is fed with a water entrance temperature of 14° C. and a water exit temperature of 22° C., and in the third zone, 24 l. of water is fed per minute as the colant with a water entrance temperature of 14° C. and an approximate water exit temperature of 22° C.

Upon leaving the calibrating tool, the profile still has a temperature of 48°–55° C.

During this operation, a vacuum of about 700 millibar is attained and maintained in the withdrawal zone of the vacuum connections.

What is claimed is:

1. An apparatus for effecting liquid cooling and calibration of a longitudinal section of a profiled article of thermoplastic synthetic resin which comprises a calibrating tool for applying a vacuum externally to the entire periphery of a longiudinal section of the profiled article, said tool being formed of a plurality of plate-like members that extend parallel to each other and that have internal calibration walls defining an aperture for calibrating the profiled article in contact with said calibrating walls; said members having vacuum slots within said walls that extend at right angles to the longitudinal direction of the tool and that adjoin the entire periphery of the profile surface of a longitudinal section of the profiled article; means for applying a vacuum to said slots; and means for feeding liquid coolant through said calibration members including at least one duct in communication with said vacuum slots whereby said liquid coolant is caused to flow transversely along the profile surface to which vacuum is applied and is discharged from the calibrating tool via said means for applying said vacuum.

2. An apparatus according to claim 1, wherein the at least one duct comprises a plurality of cooling ducts that are formed as open grooves in the longitudinal extension of the calibrating tool on the surfaces of the calibrating members and each duct having at least one coolant inlet and being connected with several vacuum slots.

3. An apparatus according to claim 2, wherein in one calibrating tool the cooling duct and the vacuum slots form a circuit system with two or more duct-vacuum slot circuit systems being provided in series in the longitudinal direction of the tool.

4. An apparatus according to claim 1, wherein the amount of coolant throughout can be adjusted by the relationship of the sizes of the flow cross section of the duct feeding the coolant as related to the sum total of the flow cross sections of the vacuum slots connected to said duct.

5. An apparatus according to claim 4, wherein the flow cross section of the duct feeding the coolant is throttled upstream of the inlet to the vacuum slots to such an extent that the flow cross section for the coolant is smaller than the flow cross section of the connected vacuum slots.

6. An apparatus according to claim 4, wherein a pressure-reducing valve is provided to control the flow of coolant within the duct feeding the coolant to said vacuum slots.

* * * * *